W. S. CORBY & J. L. PARSONS, Jr.
BAKING OVEN.
APPLICATION FILED MAR. 19, 1913.
1,138,935. Patented May 11, 1915.
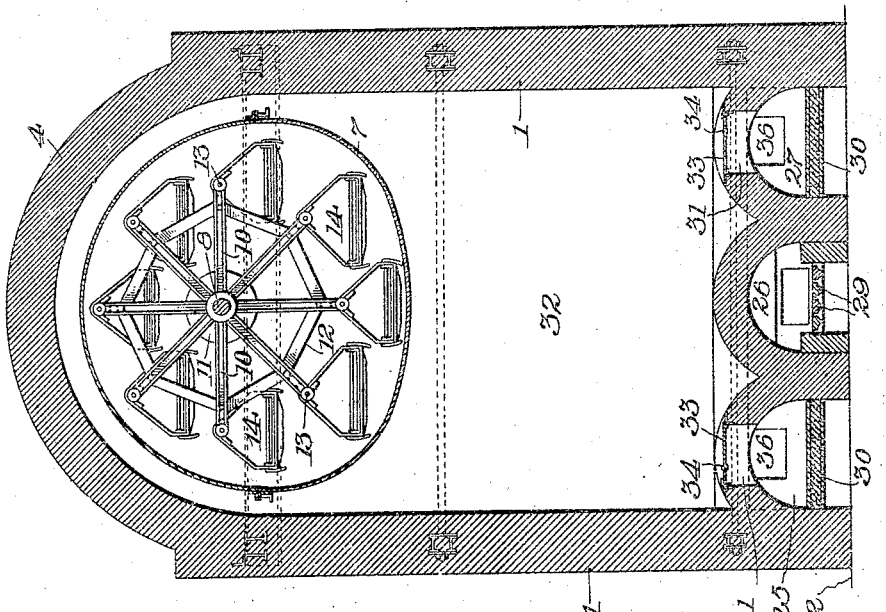
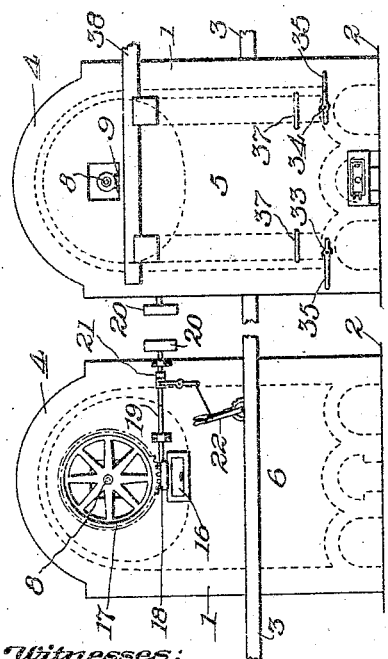
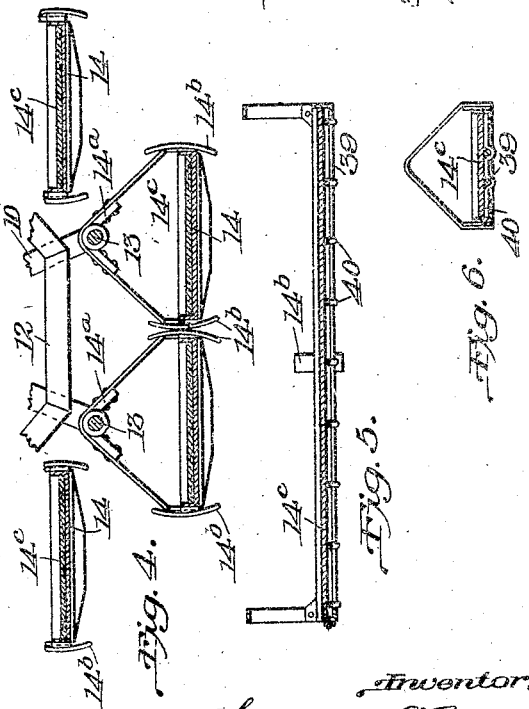

UNITED STATES PATENT OFFICE.

WILLIAM S. CORBY AND JAMES L. PARSONS, JR., OF WASHINGTON, DISTRICT OF COLUMBIA.

BAKING-OVEN.

1,138,935.   Specification of Letters Patent.   Patented May 11, 1915.

Original application filed October 12, 1912, Serial No. 725,514. Divided and this application filed March 19, 1913. Serial No. 755,587.

*To all whom it may concern:*

Be it known that we, WILLIAM S. CORBY and JAMES L. PARSONS, Jr., citizens of the United States, residing at Washington, in the District of Columbia, have invented certain new and useful Improvements in Baking-Ovens, of which the following is a specification, reference being had therein to the accompanying drawings.

This invention relates to improvements in baking ovens of the type having rotary hearth carriers on which the dough loaves are supported during the stage of baking.

The features of improvement to which the present invention more particularly relates are the novel characteristics of the rotary hearth sections or pan carriers and their relations to the rotary carrying elements of the reel considered in conjunction with the heating drum and the furnace.

The novel features which characterize more particularly the firing chamber and the heating drum have been made the subjects-matter of claims in our earlier application Serial No. 725,514, upon which Patent No. 1,107,195 was granted August 11, 1914, and to which reference can be made for an understanding of the details supplemental to those which, as aforesaid, are incident to the baking pans or rotary hearths, and the matters of relationship of these to the immediate adjacent parts.

In the drawings: Figure 1 is a front elevation of the oven, parts of the charging floor being broken away; Fig. 2 is a rear elevation; Fig. 3 is a transverse vertical sectional view; Fig. 4 shows in cross section the preferred form of tray bottom on an enlarged scale; and Figs. 5 and 6 are a longitudinal section and a cross section of a modified form of tray bottom.

It is not necessary to herein describe, in detail, the parts which constitute the outer elements of the furnace, the fire-chambers, etc., but brief reference will be made to those which are pertinent to the present matters.

1 indicates the vertical oven walls extending from the floor 2 to the floor 3, with arch 4 at the top extending from wall 5 to wall 6. There is a large heating chamber at 32 in the lower part of the oven. This chamber 32 is supplied with heat from the fire on grate 29 in the tunnel 26. The products of combustion can pass to the tunnels 25 and 27 over floors 30, and through flues 31 to the oven chamber 32 under control of the dampers 33, actuated by shafts 34 and levers 35. Flues 36 extend from tunnels 25 and 27 through wall 5 to a discharge duct 38 under control of the dampers 37.

7 is a gas-tight sheet metal drum in the upper part of the oven chamber with a narrow space around its top for hot air. This drum is of peculiar shape to relate it in an advantageous way to the rotary pan carriers, as will be described.

Within the drum there is a rotary reel structure having a shaft 8 supported in bearings 9 in walls 5 and 6. The shaft carries spiders having radial arms 10 jointed to hubs 11 secured to the shaft, these arms being stiffened by bars 12. 13, 13 are shafts supported on arms 10. 14, 14 indicate the bread trays each having hinge connection through shafts 13 with arms 10.

An object of the invention is to condense the region in which the system, as an entirety, of bread trays will always be contained; that is to say, the supporting and carrying devices are so arranged as to bring all of the trays at all times close in to a horizontal line which may be regarded as the axis of the region within which the entire system lies. This axis is somewhat below the shaft 8. The bread trays are all of the same size and character so that the loading and the unloading can be uniformly carried on. The radius upon which each swings in relation to its supporting shaft 10 is long, in respect to the total radius from the tray to the shaft 8, this radius of swing of the tray being considerable more than a third of the total radius from the tray to the said shaft. Consequently the trays can be caused to revolve in a region which is of short radius, that is to say, they are arranged compactly in a relatively small space around the reel axis. Both the upper half and the lower half of the drum are flattened relatively to a cylinder concentric with the shaft 8, so that the sheet metal both at the top and the bottom can be brought in close to the path of the trays; and, as above noted, this path is close to the median axis of their travel. In this respect the construction and arrangement of the trays and their carrier are to be distinguished from earlier structures in which long radial arms, rigid with the central shaft were used, and which at their ends carried narrow trays on short radii of hinging; the earlier constructions referred to requiring large chambers, with wide dissemination of heat, and loss. They are also to be distinguished from the earlier constructions in which trays of varying sizes were employed, each swinging on the reel or carrier at an axis differing, in its radial distance from the main center, from the axes on which the neighboring tray is swung. The swinging of the trays on long radii from their shafts 13 increases the possibility for them to swing relatively long distances in case of any unevenness of movement of the reel, or jolts resulting from stoppages or starts, and correspondingly increases the tendency for the trays to interfere or positively engage with each other as they move through those parts of their path near the central vertical longitudinal plane of the shaft 8.

The bottoms 14 of the trays are suspended by brackets and hinge bearings 14$^a$ which, by bars or stops, are connected to the metal part or frame of the tray. In Fig. 4 the trays are shown as made of metallic pans forming part of the rotary system. In Fig. 6 they are shown as having an open framework formed of longitudinal rods 39 and cross rods 40 upon which is supported a stone or earthenware bottom 14$^c$. Cast metal is omitted because of its liability to breaking. The grid 39, 40 has the ends of its bars fastened to wrought angle irons which are attached to the bracket arms. The soapstone, or other stone-like hearth piece, 14$^c$, is exposed over its whole surface, practically, and at the same time is supported in such way that in case of breakage no parts, of any size, will drop upon the trays below.

To prevent the trays, respectively, from engaging with neighbors in case any one of them should swing on its long radius from the shaft 13, we provide each side of each tray with guides or fenders 14$^b$. They are relatively long curved strips which are extended to points considerably below the tray, as shown in Fig. 4. The lower ends of these guide fenders are curved toward the central longitudinal vertical plane of the tray, so that in case of any contact with the next tray at a time considerably before they come to the same horizontal plane, they will be brought to such plane without any positive interengagement. To still further guard against such engagement or hooking or resting of one upon another, the fender bars can be extended upward, as shown on the lower trays in Fig. 4. These guides revolve with the trays in paths, the upper part of each of which is approximately a semi-ellipse with its longer axis horizontal, and the lower part of which is an ellipse of another curvature. The gas-tight heating drum 7 is correspondingly shaped so that these guides or tray-separating means can revolve close to the drum as they move through the lower parts of their paths, this bringing both the trays and their guides close to the source of heat radiation, but without danger of contact with the drum.

The trays are loaded through an opening at 16. The tray carrying reel is rotated by the gear 17, worm 18, shaft 19, belt, pulley 20, under control of the clutch and lever at 21, 22.

What we claim is:

1. The combination of the reel, the series of uniformly sized trays, the tray carriers each pivoted to the reel at a hinge axis relatively close to the reel axis and having a relatively long radius of swing from its hinge axis, all of said axes being uniformly distant from the reel axis whereby the trays are caused to revolve relatively to the reel within a region of short radius from the reel axis, the gas-tight reel-inclosing drum, and guide means at each side of each tray and carried thereby for preventing the trays respectively from positively engaging with an adjacent tray when they contact, said means revolving in paths each of which has an upper part approximately conforming to an oval of one curvature and its lower part approximating an oval of another curvature and said drum having the lower part of its wall arranged in close proximity to the lower part of the path of said means.

2. The combination of the reel, the series of uniformly sized trays, the tray carriers each pivoted to the reel at a hinge axis relatively close to the reel axis and having a relatively long radius of swing from its hinge axis, all of said axes being uniformly distant from the reel axis whereby the trays are caused to revolve relatively to the reel within a region of short radius from the reel axis, the gas-tight reel-inclosing drum and guide means at each side of each tray and carried thereby consisting of curved bars extending downward to points below the tray for preventing the trays respectively from positively engaging with an adjacent tray when they contact.

In testimony whereof we affix our signatures in the presence of two witnesses.

WILLIAM S. CORBY.
JAMES L. PARSONS, Jr.

Witnesses:
FRED TREULEBEN,
H. E. WALTER.